(12) United States Patent
Miftakhov et al.

(10) Patent No.: US 10,399,450 B2
(45) Date of Patent: Sep. 3, 2019

(54) SYSTEMS AND METHODS FOR LOCAL AUTONOMOUS RESPONSE TO GRID CONDITIONS BY ELECTRIC VEHICLE CHARGING STATIONSAS AND OTHER SIMILAR LOADS

(71) Applicant: Electric Motor Werks, Inc., San Carlos, CA (US)

(72) Inventors: Valery Miftakhov, San Carlos, CA (US); Alexander Gurzhi, San Jose, CA (US); Chris Edgette, Oakland, CA (US); Alan White, Tiburon, CA (US)

(73) Assignee: Electric Motor Werks, Inc., San Carlos, CA (US)

( * ) Notice: Subject to any disclaimer, the term of this patent is extended or adjusted under 35 U.S.C. 154(b) by 146 days.

(21) Appl. No.: 15/004,974

(22) Filed: Jan. 24, 2016

(65) Prior Publication Data

US 2016/0236584 A1 Aug. 18, 2016

Related U.S. Application Data

(63) Continuation-in-part of application No. 14/853,955, filed on Sep. 14, 2015.

(Continued)

(51) Int. Cl.
*B60L 11/18* (2006.01)
*B60L 53/63* (2019.01)
(Continued)

(52) U.S. Cl.
CPC ......... *B60L 11/1844* (2013.01); *B60L 53/305* (2019.02); *B60L 53/63* (2019.02);
(Continued)

(58) Field of Classification Search
USPC .................................................. 320/106–115
See application file for complete search history.

(56) References Cited

U.S. PATENT DOCUMENTS

2011/0202418 A1* 8/2011 Kempton ............ B60L 11/1824
705/26.1
2013/0127417 A1* 5/2013 Karner ................. G06Q 20/102
320/109

(Continued)

*Primary Examiner* — Binh C Tat
(74) *Attorney, Agent, or Firm* — TransPacific Law Group; Pavel Pogodin, Esq.

(57) ABSTRACT

A system for generating a local autonomous response to a condition of an electric grid by electric vehicle charging stations, comprising: a first electricity meter for reading current, frequency, or voltage from a first electricity supply line to one electric vehicle charging station; a second electricity meter for reading an electric current, frequency, or voltage from the electric grid supplying the plurality of electric vehicle charging stations; a third electricity meter for reading current, frequency, or voltage from a third electricity line from one or more renewable generators; and an electric vehicle charging controller operatively coupled to the first electricity meter, the second electricity meter, the third electricity meter and the electric vehicle charging stations and operable to obtain readings from the first electricity meter, the second electricity meter and the third electricity meter and to control the electric vehicle charging stations based on the obtained readings.

18 Claims, 3 Drawing Sheets

Related U.S. Application Data

(60) Provisional application No. 62/050,147, filed on Sep. 14, 2014.

(51) Int. Cl.
*B60L 53/66* (2019.01)
*B60L 53/30* (2019.01)
*B60L 53/68* (2019.01)

(52) U.S. Cl.
CPC ............ *B60L 53/665* (2019.02); *B60L 53/68* (2019.02); *B60L 2250/20* (2013.01); *Y02E 60/721* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 2013/0169226 A1* | 7/2013 | Read | B60L 11/16 320/109 |
| 2013/0179061 A1* | 7/2013 | Gadh | B60L 11/1842 701/123 |
| 2016/0257214 A1* | 9/2016 | Miftakhov | H02J 7/0027 |

\* cited by examiner

SYSTEMS AND METHODS FOR LOCAL AUTONOMOUS RESPONSE TO GRID CONDITIONS BY ELECTRIC VEHICLE CHARGING STATIONSAS AND OTHER SIMILAR LOADS

CROSS-REFERENCE TO RELATED PATENT APPLICATION

This regular U.S. patent application relies upon, claims the benefit of priority from and is a continuation-in-part of U.S. patent application Ser. No. 14/853,955 filed on Sep. 14, 2015, which relies upon and claims the benefit of priority from U.S. provisional patent application No. 62/050,147, entitled "Grid Stabilization via a Large Distributed Collection of EV Charging Stations," filed on Sep. 14, 2014, both of which are incorporated by reference herein in their entirety. This patent application is also related to two U.S. patent applications entitled "SYSTEMS AND METHODS FOR ELECTRICAL CHARGING LOAD MODELING SERVICES TO OPTIMIZE POWER GRID OBJECTIVES" and "COMPUTERIZED INFORMATION SYSTEM FOR SMART GRID INTEGRATED ELECTRIC VEHICLE CHARGING AND ASSOCIATED METHOD", filed on the same day and incorporated herein by reference.

BACKGROUND OF THE INVENTION

Field of the Invention

The disclosed embodiments relate in general to the field of electric vehicle charging technology, home electrical power storage technology and power grid management and, more specifically, to systems and methods for generating local autonomous response to electric grid conditions by electric vehicle charging stations and other controllable loads.

Description of the Related Art

Wide adoption of electric vehicles by general population requires availability of substantial electrical power capacities for purposes of electric vehicle charging. Depending on the electric vehicle and the charger used, each vehicle may require 40-200 amperes of charging electric current. As would be appreciated by persons of ordinary skill in the art, simultaneous charging of a large number of electric vehicles by residents of a neighborhood may place substantial strain on the existing local power grid, which may not have been designed to accommodate such simultaneous high power loads. With the development of new electric energy storage technologies, such as graphene supercapacitors, which may be charged to full capacity in a substantially shorter times compared to conventional lithium batteries, used in most electric vehicles, this problem of handling high simultaneous charging loads will be exacerbated. In addition to electric vehicles, many houses of the future will incorporate energy storage systems, such as Tesla Powerwall battery, which may also be charged from electric grid. Charging of such energy storage systems may also put additional strain on the existing grid infrastructure.

On the other hand, currently, electric vehicle supply equipment (EVSE, a.k.a. EV charging stations) does not provide automatic responses to local grid conditions or to the changing needs of the larger electric power grid. Accordingly, it would be desirable to have the electric vehicle supply equipment as well as other power loads that would have the ability to sense to local power grid conditions and that would autonomously respond to such conditions for purposes of stabilizing local electric grid. Therefore, new and improved systems and methods for providing automatic responses to local conditions or to the changing needs of the larger electric power grid are needed.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a system for generating a local autonomous response to a condition of an electric grid by a plurality of electric vehicle charging stations, the system incorporating: a first electricity meter for reading current, frequency, or voltage from a first electricity supply line to one of the plurality of electric vehicle charging stations; a second electricity meter for reading an electric current, frequency, or voltage from the electric grid supplying the plurality of electric vehicle charging stations; a third electricity meter for reading current, frequency, or voltage from a third electricity line from one or more renewable generators; and an electric vehicle charging controller operatively coupled to the first electricity meter, the second electricity meter, the third electricity meter, and any number, n, of electricity meters, and the plurality of electric vehicle charging stations and operable to obtain readings from the first electricity meter, the second electricity meter and the third electricity meter and to control at least one of the plurality of electric vehicle charging stations based on the obtained readings.

In one or more embodiments, the electric vehicle charging controller comprises a server disposed on a computer network and wherein the electric vehicle charging controller is coupled to the first electricity meter, the second electricity meter, the third electricity meter, and any number, n, of electricity meters, and the plurality of electric vehicle charging stations via the computer network.

In one or more embodiments, the system further comprises a remote server executing a vehicle charge control application.

In one or more embodiments, the electric vehicle charging controller comprises an internal logic to determine an appropriate charging output in response to the obtained readings.

In one or more embodiments, the electric vehicle charging controller is operable to direct the plurality of electric vehicle charging stations to vary charging load to one or more electric vehicles based upon the internal logic.

In one or more embodiments, the electric vehicle charging controller is configured to control one or more electric power generators based upon the internal logic.

In one or more embodiments, the electric vehicle charging controller comprises a local storage for storing custom presets relating to a local circuit or a local utility feeder, a frequency response requirements, or CVR requirements.

In one or more embodiments, each of the plurality of electric vehicle charging stations varies rate of charge or discharge according commands received from the electric vehicle charging controller.

In one or more embodiments, each of the plurality of electric vehicle charging stations is configured to receive vehicle owner preferences with respect to vehicle charging.

In one or more embodiments, each of the plurality of electric vehicle charging stations is configured to display to a user or to output to an outside application:

i. real time charging information;
ii. vehicle owner charging preferences;
iii. alerts regarding a charging status;
iv. vehicle state of charge; and
v. estimated time to completion of charge.

In accordance with one aspect of the embodiments described herein, there is provided a method for generating a local autonomous response to a condition of an electric grid by a plurality of electric vehicle charging stations, the method comprising: providing a first electricity meter for reading current, frequency, or voltage from a first electricity supply line to one of the plurality of electric vehicle charging stations; providing a second electricity meter for reading an electric current, frequency, or voltage from the electric grid supplying the plurality of electric vehicle charging stations; providing a third electricity meter for reading current, frequency, or voltage from a third electricity line from one or more renewable generators; and providing an electric vehicle charging controller operatively coupled to the first electricity meter, the second electricity meter, the third electricity meter, the nth electricity meter, and the plurality of electric vehicle charging stations and operable to obtain readings from the first electricity meter, the second electricity meter and the third electricity meter and to control at least one of the plurality of electric vehicle charging stations based on the obtained readings.

In one or more embodiments, the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

In one or more embodiments, the method further comprises providing a remote server executing a vehicle charge control application.

In one or more embodiments, the electric vehicle charging controller comprises an internal logic to determine an appropriate charging output in response to the obtained readings.

In one or more embodiments, the electric vehicle charging controller is operable to direct the plurality of electric vehicle charging stations to vary charging load to one or more electric vehicles based upon the internal logic.

In one or more embodiments, the electric vehicle charging controller is configured to control one or more electric power generators based upon the internal logic.

In one or more embodiments, the electric vehicle charging controller comprises a local storage for storing custom presets relating to a local circuit or a local utility feeder, a frequency response requirements, or CVR requirements.

In one or more embodiments, each of the plurality of electric vehicle charging stations varies rate of charge or discharge according commands received from the electric vehicle charging controller.

In one or more embodiments, each of the plurality of electric vehicle charging stations is configured to receive vehicle owner preferences with respect to vehicle charging.

In one or more embodiments, each of the plurality of electric vehicle charging stations is configured to display to a user or to output to an outside application:
vi. real time charging information;
vii. vehicle owner charging preferences;
viii. alerts regarding a charging status;
ix. vehicle state of charge; and
x. estimated time to completion of charge.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
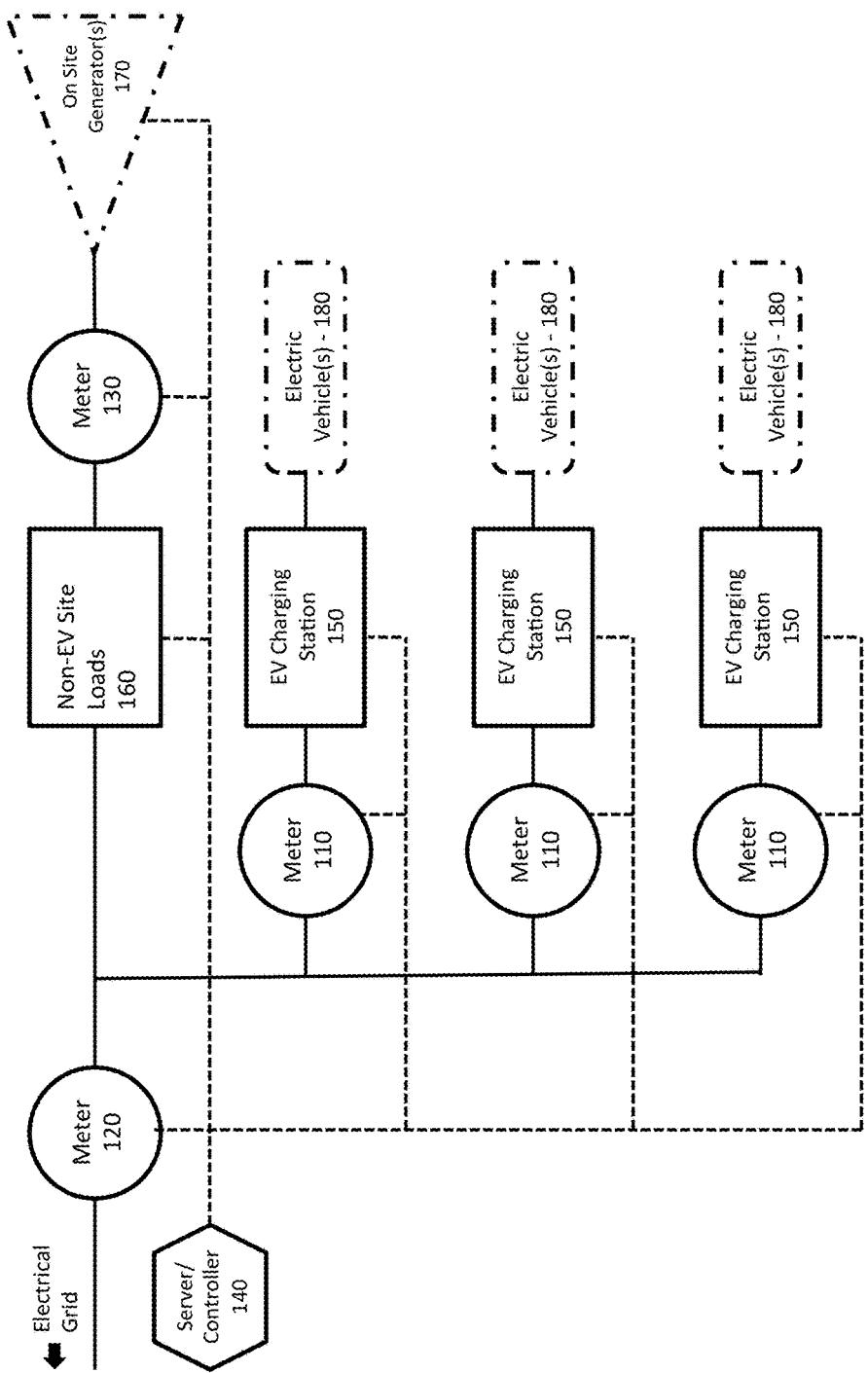
FIG. 1 illustrates an exemplary embodiment of a logical diagram of a distributed system configuration based on which the functionality described herein may be deployed.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there are provided systems and methods for generating autonomous responses to local conditions or to the changing needs of the larger electric power grid. In various embodiments, the aforesaid responses that might be provided by automatic dispatch in response to sensed grid conditions include power grid optimization and reliability functions for the local residential, industrial, or commercial site. In various embodiments, the aforesaid responses may additionally include local site functions that may help stabilize the wider power grid.

The autonomous services and/or autonomous responses referred to throughout the present description are services that may be automatically provided by an EVSE without directed dispatch by the equipment owner or operator. Various embodiments of the described inventive concepts provide several important services to the local site as well as the wider electric grid, through the aforesaid local autonomous response function of the EVSE. In one or more embodiments, when a plug-in electric vehicle is being charged using the EVSE, the EVSE is configured to provide several automatic services, each of which provides value in different ways. Services and their automatic responses include one or more of the below-described advanced functionalities, which should note be interpreted in a limited sense.

In one exemplary embodiment, the EVSE or other electrical loads are equipped to enable a dynamic load sharing among themselves. With the aforesaid dynamic load sharing, several EVSEs automatically coordinate between themselves to optimize an electrical circuit. As would be appreciated by persons of ordinary skill in the art, without such dynamic load sharing, the number of EVSEs that may be added to a given circuit and/or feeder is capped by the aggregate maximum current rating of all EVSEs, such that the combined maximum current draw of all EVSEs operating simultaneously at full charging capacity should never exceed the capacity of the electric circuit on which they are installed. This limits the number of EVSEs that can be installed on a circuit. If more EVSEs are desired on a given circuit, the entire electric circuit must be upgraded, which could be expensive and time-consuming.

On the other hand, most of the time, provisioning the full rated charging power for all EVSEs on a circuit is not required, as vehicles are either not plugged in to every EVSE, or the vehicles that are plugged in have already been fully charged. However, as would be appreciated by persons of ordinary skill in the art, there could be relatively rare periods of time when all or substantially all of the EVSEs would be simultaneously used to full or substantially full rated charging capacity resulting in peak electrical loads on the circuit.

In one or more embodiments, the limitation on the number of EVSEs on an electrical circuit can be solved by enabling individual EVSEs or groups of EVSEs to automatically reduce their charging current in cases where most or all of the EVSEs are operating simultaneously, such that the group of EVSEs as a whole never exceeds the rated current carrying capacity of the corresponding electric circuit. Accordingly, in one embodiment, the inventive EVSEs described herein include the functionality for automatic charging current reduction, based on the awareness of the circuit current limits and the aggregated charging current of the other EVSEs in the EVSE group. As would be appreciated by persons of ordinary skill I the art, such functionality automatically prevents the peak electrical loads of EVSE groups from exceeding the rated capacity of the associated electrical circuit and enables increasing the number of EVSEs without the need for expensive circuit upgrade.

In another exemplary embodiment, the EVSE or other electrical loads are equipped to enable a local load control. This capability is similar to the aforesaid dynamic load sharing, described above, wherein individual EVSEs and/or groups of EVSEs automatically reduce their charging loads to optimize the loads on the site. The difference between the two is that, in local load control, individual and/or groups of EVSEs are configured to automatically reduce individual charging loads in coordination with other site loads (e.g. air conditioning units, lighting), to maintain an overall site load lower than the limit of the electrical feeder to the site. The main benefit of the aforesaid local load control is that more EVSEs may be added to a specific site than would otherwise be possible under the existing feeder limits. This capability may also be used to reduce the customer retail demand.

In another exemplary embodiment, the EVSE or other electrical loads are equipped to enable load coordination with on-site renewable energy generation equipment. With this capability, EVSE loads may be automatically varied based upon the output of on-site renewable energy generators to ensure site electrical load stability. In various embodiments, the aforesaid on-site renewable energy generators may include, without limitation, on-site solar (e.g. photovoltaic), wind, wave, hydroelectric, biogas, fuel cell, geothermal generators or any other similar equipment. As would be appreciated by persons of ordinary skill in the art, the aforesaid listed types of renewable energy generation equipment is exemplary only and should not be construed in a limiting sense, as the inventive concepts described herein may operate with other similar power generation equipment. In various embodiments, the aforesaid automated coordination of EVSEs may allow increased capture of renewable energy, reduced customer electric costs, and/or reduced current flow to or from the site, as needed to optimize the overall customer electric load and electric costs savings.

In yet another exemplary embodiment, the EVSE or other electrical loads are equipped to enable a conservation voltage reduction. The conservation voltage reduction (CVR) is a technology used for reducing energy and peak demand. CVR is implemented upstream of end service points in the distribution system so that the efficiency benefits are realized by consumers and the electric distributor. In one or more embodiments, automated CVR capabilities are added to EVSEs to provide local benefits to the site and electric distributor hosting the charging stations.

In yet another exemplary embodiment, the EVSE or other electrical loads are equipped to enable a frequency response. With this capability, EVSEs are configured to automatically sense a frequency drop on the grid and pause the charging function to help stabilize the grid frequency. As the EVSEs are expected to represent significant grid loads in the future electric power system, the capability to automatically and quickly reduce charging load in response to grid frequency variations can provide great benefits to the grid at a very low cost.

In one or more embodiments, to enable one or more of the above-described automated responses to grid and other conditions, individual EVSEs and/or groups of EVSEs are configured to automatically measure any one, some or all of the following parameters: grid frequency, grid voltage, customer electrical load, individual EVSE load, and aggregated EVSE load. All of the aforesaid measurements may be performed using conventional electric measuring equipment well known in the art and available commercially.

In one or more embodiments, individual EVSEs and/or groups of EVSEs are equipped with on-board logic to automatically (autonomously) respond to any, some or all of the above measurements. The aforesaid on-board logic may be implemented using one or more microprocessors and/or microcontrollers appropriately programmed with software implementing the functionality described herein. The aforesaid microprocessors and/or microcontrollers are well known in the art and are available commercially from multiple electronic suppliers.

In one or more embodiments, the described on-board logic may seek to optimize supply current delivered by the EVSEs to electric vehicles (or any other electrical loads) to enable any, some or all of the following functions: dynamic load sharing, load coordination with on site renewables, conservation voltage reduction, and/or frequency response. In one or more embodiments, individual EVSEs and/or groups of EVSEs are provided with on-board capability to vary their supply current delivered to plug-in electric vehicles in response to the commands issued by the aforesaid on-board logic described above. Such capability may be provided using conventional electronic components such as electro-mechanic relays, thyristors, high-power MOS transistors, electronic current switches and the like, which are well known in the art and widely available commercially.

FIG. 1 illustrates an exemplary embodiment of a distributed system configuration based on which the functionality described herein may be deployed. Various elements shown in FIG. 1 and their respective functions are described in detail below.

Specifically, in one or more embodiments, the distributed system configuration shown in FIG. 1 incorporates one or more electric meters 110, configured for reading current, frequency, voltage and/or other parameters from the electric power line(s) feeding one or more corresponding individual EV charging stations 150. In one or more embodiments, the electric meters 110 are appropriately connected to return the measured meter readings via a communication path to one or more EV charging station(s) 150. In an alternative embodiment the meters 110 may be integrated into the corresponding EV charging stations 150.

In one or more embodiments, the distributed system configuration shown in FIG. 1 further incorporates an electric meter 120, which is connected between various on-site electrical loads (shown to the right thereof), including non-EV on-site loads 160 as well as EV charging stations 150, and the electric grid (shown to the left thereof). In one or more embodiments, this electric meter is configured to perform reading of current, frequency, voltage and/or other parameters from the electric supply (feed) line to the entire site. In various embodiments, the electric meter 120 is capable of returning the appropriate meter readings via a communication path to one or more EV charging station(s) 150. It should be appreciated that electric meter 120 is optional and not required not required to enable some aspects of the embodiments described herein.

In one or more embodiments, the distributed system configuration shown in FIG. 1 further incorporates one or more electric meters 130 for reading current, frequency, voltage and/or other parameters from the electricity line connecting one or more on-site renewable energy generators, such as on-site solar (e.g. photovoltaic), wind, wave, hydroelectric, biogas, fuel cell, geothermal generators and/or any other similar power generation equipment. In one or more embodiments, the electric meter(s) 130 are capable of returning respective meter readings via a communication path to one or more EV charging station(s) 150. It should be appreciated that electric meter(s) 130 is optional and not required not required to enable some aspects of the embodiments described herein.

In one or more embodiments, the distributed system configuration shown in FIG. 1 further incorporates a master controller/server 140. In various embodiments, the master controller/server 140 is implemented based on a computerized data processing system incorporating one or more processors or microcontrollers, memory and communication interface. In various embodiments, the master controller/server 140 functions as an electric vehicle charging controller with one or more of the below-described features. In one or more embodiments, the master controller/server 140 is communicatively coupled, via an appropriate wired or wireless data interconnect, to one or more of the above-described electrical meters 110, 120 and 130. As such, the master controller/server 140 is capable of receiving the reading(s) from the corresponding electric meters. Possible embodiments of the aforesaid data interconnects include WIFI communication interface, USB interface, IP-based network interface as well as any other now known or later developed data communication interfaces. It should be appreciated that the embodiments described herein are not dependent on the specific type of the communication interface used for connecting the master controller/server 140 to the electrical meters 110, 120 and 130.

In one or more embodiments, the master controller/server 140 is communicatively coupled, via an appropriate data communication interconnect, to a user application hosted on a remote server and/or station controls. In one embodiment, the master controller/server 140 sends measurement and/or other data to the aforesaid user application and receives user commands.

In one or more embodiments, the master controller/server 140 incorporates a logic to determine appropriate charging output current for one or more EV charging stations 150 and/or other on-site loads in response to one or more readings of the electrical meters 110, 120 and 130. In one or more embodiments, the aforesaid logic may be implemented using one or more processors executing one or more software applications embodying the corresponding functionality. In various embodiments, the master controller/server 140 is connected to the internet and has capability to automatically download from an external storage server and install the aforesaid software applications implementing the described logic.

In one or more embodiments, the master controller/server 140 further incorporates an interface for directing EV charging stations 150 to vary charging load to one or more electric vehicles based upon the determinations made by the above-described internal logic. In various embodiments, the aforesaid interface may be implemented using any now known or later developed wired or wireless interconnect.

Finally, in one or more embodiments, the master controller/server 140 incorporates a storage system for storing one or more custom presets and/or other parameters or data associated with the local circuit and/or utility feeder, frequency response requirements, and/or the aforesaid CVR requirements. In one or more embodiments, the aforesaid parameters may be stored in a database executing on one or more processors of the master controller/server 140.

It should be further noted that in one exemplary embodiment, the above-described functionality of the master controller/server 140 may be integrated into one or more of the EV charging stations 150.

In one or more embodiments, the described distributed system configuration shown in FIG. 1 further incorporates one or more EV charging stations 150 with slave control capability. Each EV charging station 150 is intermittently connectable to one or more electric vehicles (EVs) 180 and configured to provide electric charge thereto. These electric vehicles (EVs) 180 may exist in various states of charge. In various embodiments, the EV charging stations 150 may incorporate one or more of the below-described features. In one embodiment, the EV charging stations 150 have the capability to vary electric vehicle charge and discharge rate according to internal controls, commands received from the master controller/server 140 and/or commands received from user application.

In one embodiment, the one or more EV charging stations 150 have the capability to receive vehicle owner's preferences or user commands via one or more hardware controls disposed directly or indirectly on the EV charging stations 150 or via a user interface co-located with the respective EV charging station 150. In another embodiment, the EV charging stations 150 are capable of receiving owner's preferences or commands via a network interface communicable, via an appropriate wired or wireless network, with a mobile application executing on user's mobile device.

In one embodiment, the one or more EV charging stations 150 further have the capability to display directly to the user (using a co-located user interface or otherwise) or to communicate to a remote server application or user's mobile application one or more of the following information items: 1) real time charging information; 2) vehicle owner charging preferences; 3) alerts regarding charging status; 4) vehicle state of charge; and/or 5) estimated time to completion of charge.

In one or more embodiments, the described distributed system configuration shown in FIG. 1 further incorporates one or more non-EV on-site loads 160. The aforesaid non-EV on-site loads 160 comprise loads such as air conditioning, lighting, plug loads, etc. It should be noted that, in various embodiments, these loads 160 may be independently metered and/or controlled by the EV charging stations 150 autonomous logic controls.

In one or more embodiments, the described distributed system configuration shown in FIG. 1 further incorporates one or more on-site generator(s) 170. The generators 170 may include one or more renewable and/or non-renewable electric energy generators, which may be located behind or in front of the on-site loads within the electric circuit. In various embodiments, the generators 170 may be controllable by the logic of the EV charging station(s) 150.

In one or more embodiments, the described distributed system configuration shown in FIG. 1 further incorporates communication path 190 interconnecting the electric meters 110, 120 and 130, EV charging stations 150, master controller/server(s) 140, on-site generators 170 and/or non-EV site loads 160. This communication path may be implemented using any now known or later developed interconnect.

Finally, in one or more embodiments, the described distributed system configuration shown in FIG. 1 further incorporates electricity path 195, which may be comprised of electric power conductors transmitting electrical energy from the electric grid to various on-site loads and generators.

Figure 2:
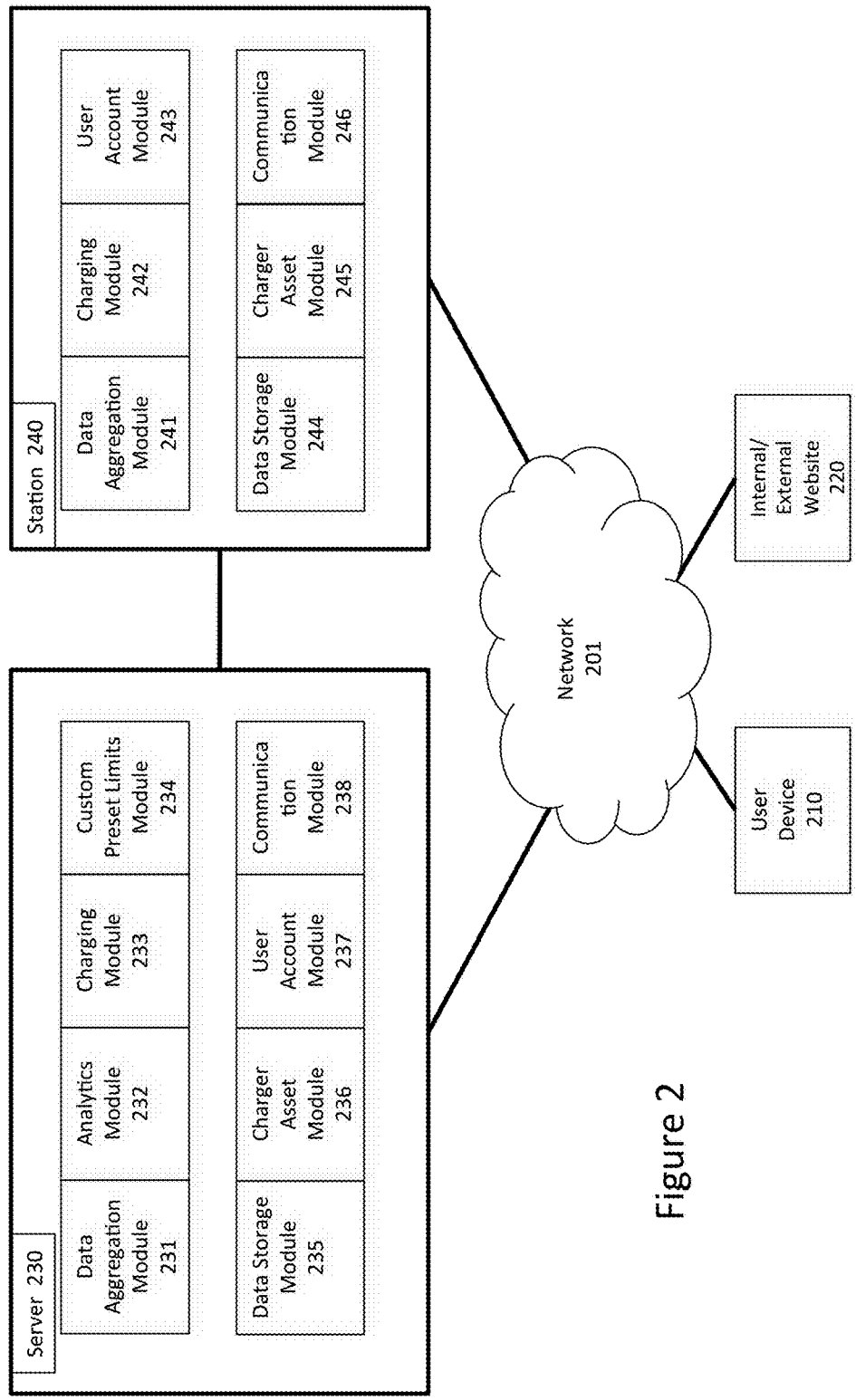
FIG. 2 illustrates certain exemplary internal components of the described distributed system shown in the logical diagram of FIG. 1.

FIG. 2 illustrates certain exemplary internal components of the described distributed system shown in the logical diagram of FIG. 1. Specifically, a server system 230, which may perform the functions of the master controller/server 140 of FIG. 1, incorporates multiple integral components or modules described in detail below. In one or more embodiments, the server 230 incorporates a data aggregation module 231 configured for receiving and aggregating the measured data from various meters including, without limitation, the electric meters 110, 120 and 130.

In various embodiments, the server system 230 further incorporates an analytics module 232 for performing analysis of the measured data from various meters including, without limitation, the electric meters 110, 120 and 130. The server system 230 may further incorporate a charging module 233 for controlling the charging of one or more electric vehicles 180 by the EV charging stations 150. In various embodiments, the server system 230 may further incorporate a custom preset limits module 234 storing presets reflecting the operating limits of the EV or other loads requiring charging.

In one or more embodiments, the server system 230 may further incorporate a data storage module 235, storing and managing all of the data collected by multiple electric meters, including, without limitation, the electric meters 110, 120 and 130 and corresponding to various charging stages and charging events. The server system 230 may further incorporate a user account module 237 for managing one or more user accounts and storing and managing the associated user data, user preferences and other related information. In various embodiments, the aforesaid user account data managed by the user account module 237 may include the user authentication information for authenticating the user, and user preference data representing user charging preferences, such as time and rate of charging.

In one or more embodiments, the server system 230 may further incorporate a charger asset module 236, which is configured to automatically identify each asset which charges electrical vehicles, home energy storage systems, appliances or other loads. The server system 230 may further incorporate a communication module 238 configured to enable communication between the server system 230, the electric meters 110, 120 and 130 and the EV charging stations 150.

In one or more embodiments, the charging station 230, which may function as the aforesaid EV charging station 150, incorporates a data aggregation module 241, a charging module 242, a user account module 243, a data storage module 244, a charger asset module 245 and a communication module 246, which have functions, which are generally similar to the respective functions of the corresponding modules of the server system 230.

Figure 3:
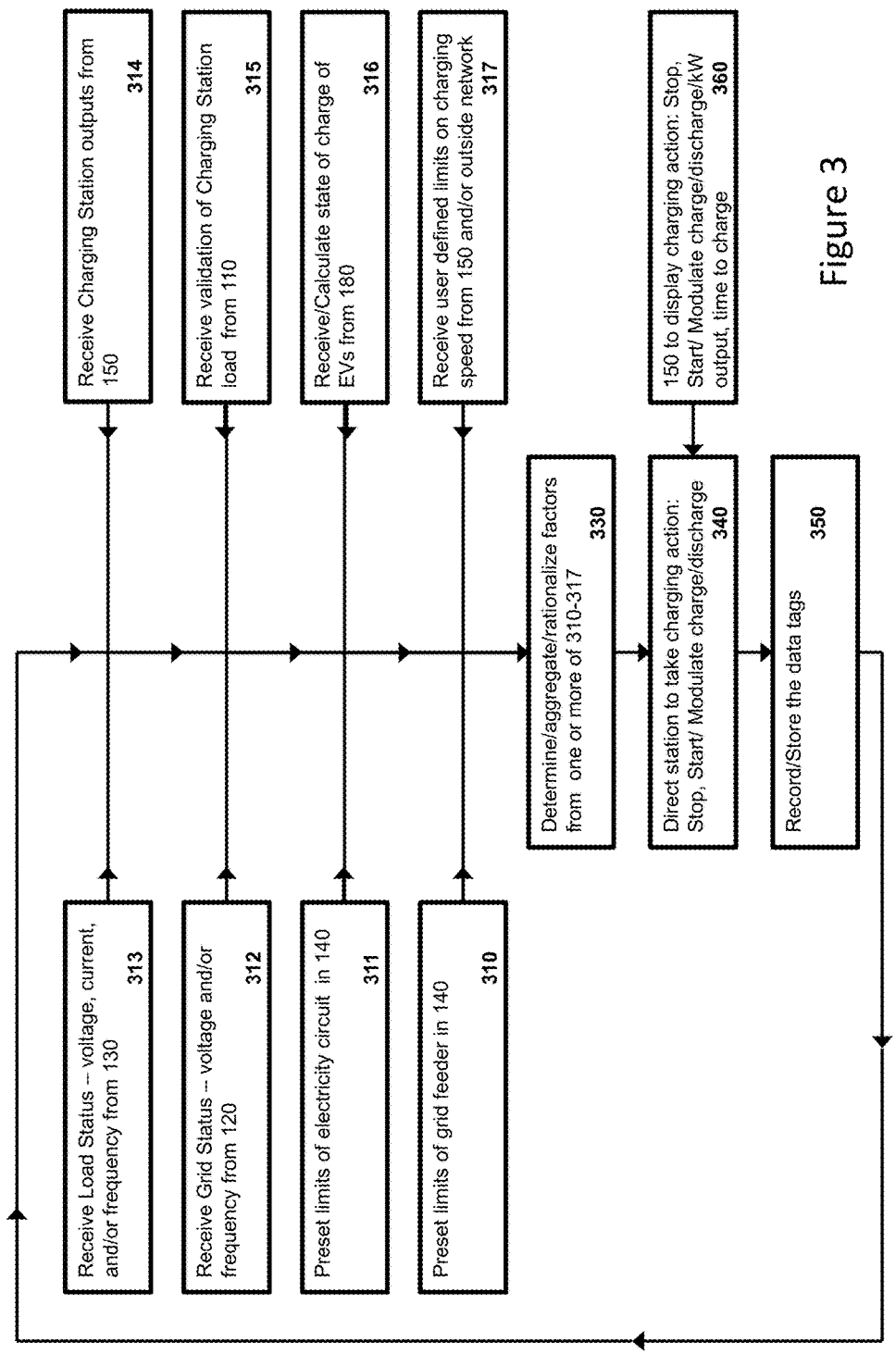
FIG. 3 illustrates a block diagram of an exemplary embodiment of an automated dispatch method performed by the remote server 140 or the charging station 150.

FIG. 3 illustrates a block diagram of an exemplary embodiment of an automated dispatch method performed by the remote server 140 or the charging station 150, either of which is being referred to below as "the system".

First, at step 313, the system receives electrical load status information, including, without limitation, the frequency, voltage, current, and amperage readings from a meter, such as the electric meter 130 shown in FIG. 1.

Subsequently, at step 312, the system receives electrical grid status information, including, without limitation, the frequency, voltage, current, and amperage readings from a meter, such as the electric meter 120 shown in FIG. 1.

After that, at step 311, the system establishes preset limits of the electric circuit, using, for example, the custom preset limits module 234 of the server 230 shown in FIG. 2 or server/controller 140 shown in FIG. 1.

After that, at step 311, the system establishes grid feeder limits, and stores those limits in the appropriate module of the server/controller 140 illustrated in FIG. 1.

At step 314, the system receives the output data from the EV charging stations 150 shown in FIG. 1 or other EVSE.

At step 315, the system receives independent validation of an electric vehicle charging load from, for example, the electric meters 100 shown in FIG. 1.

At step 316, the system receives the state of charge (SoC) information from electric vehicles 180 shown in FIG. 1.

At step 317, the system receives one or more commands from a user, using, for example, the user mobile device 210 shown in FIG. 2, to define certain predetermined parameters, such as user-specified speed of charge of the EV.

At step 330, the system rationalizes all of the data and other factors received in the aforesaid steps 310-317.

At step 340, the system issues a command for the charging station 150 to take the appropriate action, such as to stop, start, or modulate charging of the asset, such as the EV 180 in FIG. 1.

At step 350, the system stores all the relevant data and the corresponding data tags.

At step 360, the system causes the charging station 150 to display the taken charging action, such as stopping, starting or modulating the charging, as commanded by the dispatch server using the data tags.

As would be appreciated by persons of ordinary skill in the art, the above-described inventive concepts may be applied not only to electric vehicle charging stations, but also to any other systems, which are configured to deliver electric power to electric loads. Examples of such systems may include home energy storage systems, heating systems, air conditioning systems, etc.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in systems and methods for generating automatic responses to local conditions or to the changing needs of the larger electric power grid. It is intended that the specification and examples be considered as exemplary only, with a true scope and spirit of the invention being indicated by the following claims.

What is claimed is:

1. A system for generating a local autonomous response to a condition of an electric grid by a plurality of electric vehicle charging stations, the system comprising:
    a. a first electricity meter for reading an electric current, frequency, or voltage from a first electricity supply line to one of the plurality of electric vehicle charging stations;
    b. a second electricity meter for reading an electric current, frequency, or voltage from the electric grid supplying the plurality of electric vehicle charging stations;
    c. a third electricity meter for reading an electric current, frequency, or voltage from a third electricity supply line from one or more renewable generators; and
    d. an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings, wherein each of the plurality of electric vehicle charging stations is configured to display to a user or to output to an outside application:
        i. a real time charging information;
        ii. a vehicle owner charging preferences;
        iii. alerts regarding a charging status;
        iv. a vehicle state of charge; and
        v. and estimated time to completion of charge.

2. The system for generating a local autonomous response to a condition of an electric grid of claim 1, wherein the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

3. The system for generating a local autonomous response to a condition of an electric grid of claim 1, further comprising a remote server executing a vehicle charge control application.

4. The system for generating a local autonomous response to a condition of an electric grid of claim 1, wherein the electric vehicle charging controller comprises an internal logic to determine an appropriate charging output in response to the obtained readings.

5. The system for generating a local autonomous response to a condition of an electric grid of claim 4, wherein the electric vehicle charging controller is operable to direct the plurality of electric vehicle charging stations to vary charging load to one or more electric vehicles based upon the internal logic.

6. The system for generating a local autonomous response to a condition of an electric grid of claim 4, wherein the electric vehicle charging controller is configured to control one or more electric power generators based upon the internal logic.

7. The system for generating a local autonomous response to a condition of an electric grid of claim 1, wherein the electric vehicle charging controller comprises a local storage for storing custom presets relating to a local circuit or a local utility feeder, a frequency response requirements, or conservation voltage reduction (CVR) requirements.

8. The system for generating a local autonomous response to a condition of an electric grid of claim 1, wherein each of the plurality of electric vehicle charging stations varies rate of charge or discharge according commands received from the electric vehicle charging controller.

9. The system for generating a local autonomous response to a condition of an electric grid of claim 1, wherein each of the plurality of electric vehicle charging stations is configured to receive vehicle owner preferences with respect to vehicle charging.

10. A method for generating a local autonomous response to a condition of an electric grid by a plurality of electric vehicle charging stations, the method comprising:
    a. providing a first electricity meter for reading current, frequency, or voltage from a first electricity supply line to one of the plurality of electric vehicle charging stations;
    b. providing a second electricity meter for reading an electric current, frequency, or voltage from the electric grid supplying the plurality of electric vehicle charging stations;
    c. providing a third electricity meter for reading current, frequency, or voltage from a third electricity line from one or more renewable generators; and
    d. providing an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings, wherein each of the plurality of electric vehicle charging stations is configured to display to a user or to output to an outside application:
        i. a real time charging information;
        ii. a vehicle owner charging preferences;
        iii. alerts regarding a charging status;
        iv. a vehicle state of charge; and
        v. and estimated time to completion of charge.

11. The method for generating a local autonomous response to a condition of an electric grid of claim 10, wherein the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

12. The method for generating a local autonomous response to a condition of an electric grid of claim 10, further comprising providing a remote server executing a vehicle charge control application.

13. The method for generating a local autonomous response to a condition of an electric grid of claim 10, wherein the electric vehicle charging controller comprises an internal logic to determine an appropriate charging output in response to the obtained readings.

14. The method for generating a local autonomous response to a condition of an electric grid of claim 13, wherein the electric vehicle charging controller is operable to direct the plurality of electric vehicle charging stations to vary charging load to one or more electric vehicles based upon the internal logic.

15. The method for generating a local autonomous response to a condition of an electric grid of claim 13, wherein the electric vehicle charging controller is configured to control one or more electric power generators based upon the internal logic.

16. The method for generating a local autonomous response to a condition of an electric grid of claim 10, wherein the electric vehicle charging controller comprises a local storage for storing custom presets relating to a local circuit or a local utility feeder, a frequency response requirements, or conservation voltage reduction (CVR) requirements.

17. The method for generating a local autonomous response to a condition of an electric grid of claim 10, wherein each of the plurality of electric vehicle charging stations varies rate of charge or discharge according commands received from the electric vehicle charging controller.

18. The method for generating a local autonomous response to a condition of an electric grid of claim 10, wherein each of the plurality of electric vehicle charging stations is configured to receive vehicle owner preferences with respect to vehicle charging.

* * * * *